(12) United States Patent
Duffy et al.

(10) Patent No.: US 11,675,495 B2
(45) Date of Patent: Jun. 13, 2023

(54) HANDWRITING FEEDBACK

(71) Applicant: SOCIETE BIC, Clichy (FR)

(72) Inventors: David Duffy, Zurich (CH); Christopher-John Wright, Lausanne (CH); Timothy Giles Beard, Lausanne (CH); Wai Keith Lau, Lausanne (CH); William Andrew Schnabel, Lausanne (CH)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/676,014

(22) Filed: Feb. 18, 2022

(65) Prior Publication Data
US 2022/0291827 A1 Sep. 15, 2022

(30) Foreign Application Priority Data

Mar. 9, 2021 (EP) .................................... 21305281

(51) Int. Cl.
*G06F 3/04883* (2022.01)
*G06F 40/166* (2020.01)
(Continued)

(52) U.S. Cl.
CPC ...... *G06F 3/04883* (2013.01); *G06F 3/03545* (2013.01); *G06F 3/044* (2013.01);
(Continued)

(58) Field of Classification Search
CPC .. G06F 3/04883; G06F 3/044; G06F 3/03545; G06F 40/166; G06F 40/20;
(Continued)

(56) References Cited

U.S. PATENT DOCUMENTS

| 7,646,913 B2 * | 1/2010 | Abdulkader ....... G06V 10/7625 |
| | | 382/187 |
| 9,155,487 B2 * | 10/2015 | Linderman ............. G06F 3/017 |
| (Continued) | | |

FOREIGN PATENT DOCUMENTS

WO 2014/200736 A1 12/2014

OTHER PUBLICATIONS

Extended European Search Report dated Sep. 3, 2021 in counterpart EP Application No. 21305281.4 (8 pages).

*Primary Examiner* — Darlene M Ritchie
(74) *Attorney, Agent, or Firm* — Bookoff McAndrews, PLLC

(57) ABSTRACT

A computer-implemented method for generating feedback based on a handwritten text, comprises the steps of initializing a writing instrument to be used in a writing operation comprising a handwritten text and capturing and processing the handwritten text to generate digital text data. The method further comprises the steps of identifying at least one handwritten text attribute associated with the digital text data, comparing the at least one handwritten text attribute with predefined textual feature attributes, and generating a textual feature based on the compared at least one handwritten text attribute and predefined textual feature attributes. In addition, the method comprises the steps of modifying the digital text data using the textual feature and generating feedback to a user based on the modified digital text data.

19 Claims, 4 Drawing Sheets

(51) Int. Cl.
 *G06F 40/20*  (2020.01)
 *G06V 30/142*  (2022.01)
 *G06F 3/044*  (2006.01)
 *G06V 30/244*  (2022.01)
 *G06V 30/226*  (2022.01)
 *G06V 30/32*  (2022.01)
 *G06F 3/0354*  (2013.01)
 *G06F 3/01*  (2006.01)

(52) U.S. Cl.
 CPC ............ *G06F 40/166* (2020.01); *G06F 40/20* (2020.01); *G06V 30/1423* (2022.01); *G06V 30/226* (2022.01); *G06V 30/245* (2022.01); *G06V 30/32* (2022.01); *G06F 3/018* (2013.01); *G06T 2200/24* (2013.01)

(58) Field of Classification Search
 CPC .............. G06F 18/24133; G06F 3/018; G06V 30/1423; G06V 30/226; G06V 30/245; G06V 30/32; G06V 10/426; G06T 2200/24; G06K 9/6271

See application file for complete search history.

(56) References Cited

U.S. PATENT DOCUMENTS

| | | |
|---|---|---|
| 2005/0105799 A1 | 5/2005 | Strohecker et al. |
| 2006/0078200 A1* | 4/2006 | Koyama ............ G06V 30/2455 |
| | | 382/181 |
| 2012/0239397 A1* | 9/2012 | Napper ................ G06Q 10/063 |
| | | 382/187 |
| 2017/0052696 A1* | 2/2017 | Oviatt ................. G06F 3/04883 |
| 2017/0109566 A1* | 4/2017 | Mostofsky ............. G09B 11/04 |
| 2017/0193323 A1* | 7/2017 | Reese ...................... G06F 18/22 |
| 2018/0079254 A1* | 3/2018 | Neubauer .............. B43K 29/08 |
| 2020/0251217 A1* | 8/2020 | Cassuto ................. G16H 20/10 |

* cited by examiner

HANDWRITING FEEDBACK

CROSS REFERENCE TO RELATED APPLICATIONS

This application claims priority from European patent application No. 21305281.4, filed on Mar. 9, 2021, the contents of which are hereby incorporated herein in their entirety by this reference.

TECHNICAL FIELD

The present disclosure relates to the field of writing operations, more specifically to a computer-implemented method for generating feedback based on a handwritten text, and a system configured to run the computer-implemented method.

BACKGROUND

Algorithms to gain an understanding of a text or to create a visual feedback in form of an output text based on various input parameters have emerged in recent years. As an example, commercial font products are typically designed by specific attribute requirements, e.g., cursive, width or angularity, and are created by designers by hand. New algorithms are able to perform a similar task: creating glyph images in new font styles by editing existing fonts and interpolating among different fonts. More specifically, such new fonts or font styles can be synthesized based on a set of input attributes and corresponding weighting values. Similar examples are image generation algorithms that can be configured to generate an image or image style changes of a default image based on a user preference and/or linguistic or semantic features of an input text. Such algorithms can be web-based and can run in near-real time.

In other research fields, algorithms have been developed that are capable of analyzing a user's handwriting and extracting data to infer information about a user in real-time that may not be noticeable to an untrained eye. Such data may be used to determine the emotional state of a user, e.g., positive, neutral or negative mood.

However, during a user's handwriting operation, there are currently no options for informing a user to certain features or changes in their handwriting which may be important indicators for improvements in handwriting, or for informing a user of their current emotional state for self-reflection. Furthermore, an assessment of features of a user's handwriting are typically unidentifiable to an untrained user and may require expert analysis. In addition, a handwriting assessment in view of emotional state and neatness can be a lengthy process, not allowing for real-time improvement or self-reflection.

Thus, the object of the present disclosure is to provide a computer-implemented method and/or a system configured to enable real-time and/or modified digital feedback of a user's handwriting. Another object of the present disclosure is to provide a computer-implemented method and/or a system capable of analyzing a user's handwriting and informing a user of physical and/or psychological characteristics associated with their handwriting.

SUMMARY

The present disclosure relates to a computer-implemented method for generating feedback based on a handwritten text, and a system for generating feedback based on a handwritten text.

According to a first aspect of the present disclosure, a computer-implemented method for generating feedback based on a handwritten text is provided, which comprises the steps of initializing a writing instrument to be used in a writing operation comprising a handwritten text and capturing and processing the handwritten text to generate digital text data. The method further comprises the steps of identifying at least one handwritten text attribute associated with the digital text data, comparing the at least one handwritten text attribute with predefined textual feature attributes, and generating a textual feature based on the compared at least one handwritten text attribute and predefined textual feature attributes. In addition, the method comprises the steps of modifying the digital text data using the textual feature and generating feedback to a user based on the modified digital text data. Users may receive real-time feedback about subtle changes in their handwriting, more specifically at performing a handwritten text by using the writing instrument. Thereby, handwriting legibility and/or informative feedback on a user's state of mind (e.g., neutral, positive, or negative mood, anxiety) for self-reflection may be improved. In detail, the enablement of a continuous feedback referring to a handwritten text performed by a user and associated subtle changes may lead to accelerated learning and improvements of handwriting. The feedback may provide the user with a self-reflection about the user's mood and emotional state derived from the handwritten text.

In embodiments, the textual feature may be a font. The feedback may be a visual feedback, more specifically wherein the visual feedback may include an output text. In embodiments, the output text may comprise the font.

The handwritten text may be provided by a text written by a user using the writing instrument on a writing medium. More specifically, the handwritten text may be semantically and/or linguistically interpretable with respect to at least one communication language.

In embodiments, the writing medium may be a sheet of paper or a digital sheet. The writing instrument may be a ballpoint pen, a fountain pen, a felt-tip pen, a brush, a pencil, or a digital pen.

The feedback may be visual feedback that is displayed to a user via a user interface subsystem comprising a displaying unit.

Initializing the writing instrument may comprise capturing input data, more specifically via the user interface subsystem. Furthermore, capturing input data may comprise applying an input algorithm. The input algorithm may be configured to prompt at least one user interaction via the user interface subsystem guiding a user to identify at least one preference to be assessed.

More detailed, the identified preference may comprise at least one physical preference and/or at least one psychological preference associated with the handwritten text. Furthermore, the input algorithm may be configured to receive at least one identified preference via the user interaction. The identified preference may lead to more tailored feedback provided to a user based e.g. on a user's needs, e.g., improving handwriting and/or deriving information about an emotional state of mind.

In embodiments, the input algorithm may be configured to prompt at least one user interaction via the user interface subsystem guiding a user to start a writing operation and/or to select a writing medium.

Capturing and processing the handwritten text may comprise capturing tracking data from a capturing subsystem, wherein the capturing subsystem may be configured to generate tracking data of the writing instrument during a writing operation.

The tracking data may comprise one or more of motion tracking data of the writing instrument, visual data of a writing medium and/or the writing instrument, and capacity sensitive surface data of a capacity sensitive surface.

The capturing subsystem may comprise one or more sensors including a capacity sensitive surface, an accelerometer, a gyroscope, a magnetometer, a force sensor, and/or an optical sensor.

The motion tracking data may comprise one or more of a position of the writing instrument, a direction of motion of the writing instrument, a speed of motion of the writing instrument, an acceleration of motion of the writing instrument, a force acting on the writing instrument, a mode of handling of the writing instrument, and a mode of use of the writing instrument.

In an embodiment, capturing tracking data may comprise continuously monitoring the tracking data via the capturing subsystem, more specifically wherein the tracking data may comprise a time stamp.

In embodiments, the capturing subsystem may be integrated in the writing instrument and/or in an external device. In an embodiment, the external device may be part of the user interface subsystem.

In embodiments, the capturing subsystem may comprise a digital sheet, more specifically a touchpad, a touch screen, or a graphics tablet.

Capturing and processing a handwritten text may comprise applying a writing digitization algorithm configured to convert tracking data to digital text data. More detailed, the writing digitization algorithm may be configured to convert tracking data to a set of handwriting feature vectors, and to convert the set of handwriting feature vectors to digital text data via vector-to-character mapping.

In embodiments, the set of handwriting feature vectors may comprise one or more of a line width feature vector, a letter height feature vector, a performance time feature vector, a letter spacing feature vector, a cursive feature vector, an angularity feature vector and/or a fluidity feature vector.

In embodiments, the digital text data may comprise at least one indexed character, word and/or sentence.

Identifying at least one handwritten text attribute associated with the digital text data may comprise applying a handwriting attribute identification algorithm.

The handwriting attribute identification algorithm may be configured to determine at least one handwritten text attribute by processing the digital text data, more specifically by processing the set of handwriting feature vectors. In embodiments, the handwriting attribute identification algorithm may be configured to determine at least one relevant handwriting feature vector of the set of handwriting feature vectors based on a dominance of the respective handwriting feature vectors. The handwriting attribute identification algorithm may be configured to select the at least one relevant handwriting feature vector.

The handwriting attribute identification algorithm may be configured to associate the at least one handwritten text attribute with an attribute weighting, based on the determined relevant feature vectors and their dominance, more specifically wherein the attribute weighting is determined by feature-to-attribute mapping. In embodiments, the at least one handwritten text attribute may comprise a physical attribute and/or a psychological attribute.

Comparing the at least one handwritten text attribute with predefined textual feature attributes may comprise applying a textual feature selection algorithm.

The predefined textual feature attributes may be stored in a textual feature attribute database. The textual feature attribute database may comprise predefined attribute weightings for each of the predefined textual feature attributes.

In embodiments, the predefined textual feature attributes may comprise identifiers related to the at least one handwritten text attribute. The textual feature selection algorithm may be configured to search and select relevant predefined textual feature attributes associated with the at least one handwritten text attribute based on the identifiers.

The textual feature selection algorithm may be configured to alter one or more of the predefined attribute weightings of relevant predefined textual feature attributes based on the at least one handwritten text attribute and/or based on the identified preference. Since predefined attribute weightings can be altered based on an identified preference, a user may experience more focused feedback, tailored to a user's preference.

Generating the textual feature may comprise applying a textual feature selection algorithm configured to select at least one predefined textual feature from a textual feature database comprising a plurality of predefined textual features.

The textual feature selection algorithm may be configured to select the at least one predefined textual feature based on the at least one handwritten text attribute, the identified preference and/or the relevant predefined textual feature attributes.

In embodiments, the textual feature selection algorithm may be configured to continuously adapt the at least one predefined textual feature based on a change of the at least one handwritten text attribute, the preference and/or the relevant predefined textual feature attributes. This may lead to a user experiencing real-time feedback, more specifically visual feedback, as the writing operation progresses.

Generating the textual feature may comprise applying a textual feature generator network trained to perform a style transfer of the at least one predefined textual feature.

Modifying the digital text data using the textual feature may comprise applying the textual feature generator network configured to transform the digital text data by using the textual feature. In embodiments, the textual feature generator network may be configured to transform the digital text data to a vector image being transformable based on altered predetermined textual feature attribute weightings.

Generating feedback to a user based on the modified digital text data may comprise applying a rendering algorithm configured to render modified digital text data into feedback data and reproducing the feedback data on the user interface subsystem. In embodiments, the feedback may be a visual feedback, and wherein generating feedback to a user based on the modified digital text data further may comprise displaying the visual feedback on the user interface subsystem.

According to a second aspect of the present disclosure, a system for generating feedback based on a handwritten text is provided, which comprises a writing instrument configured to be operated by a user to perform a handwritten text, and a capturing subsystem configured to capture the handwritten text. Furthermore, the system comprises a processing subsystem configured to process the handwritten text to digital text data, to identify at least one handwritten text attribute associated with the digital text data, to compare the at least one handwritten text attribute with predefined textual feature attributes, to generate a textual feature based on the compared at least one handwritten text attribute and predefined textual feature attributes, and to modify the digital text data using the textual feature. In addition, the system comprises a user interface subsystem configured to generate feedback based on the modified digital text data and to reproduce the generated feedback to the user.

In embodiments, the textual feature may be a font. The feedback may be a visual feedback including an output text.

The writing instrument may be configured to be used on a writing medium, more specifically wherein the writing medium may be a sheet of paper or a digital sheet. In embodiments, the writing instrument may be a ballpoint pen, a fountain pen, a felt-tip pen, a brush, a pencil, or a digital pen.

The user interface subsystem may comprise a displaying unit, more specifically wherein the displaying unit may comprise a capacity sensitive surface.

The capturing subsystem may be configured to generate tracking data of the writing instrument during a writing operation. In embodiments, the tracking data may comprise one or more of motion tracking data of the writing instrument, visual data of a writing medium and/or the writing instrument, and capacity sensitive surface data of a capacity sensitive surface.

The capturing subsystem may comprise one or more sensors including a capacity sensitive surface, an accelerometer, a gyroscope, a magnetometer, a force sensor, and/or an optical sensor.

In embodiments, the motion tracking data may comprise one or more of a position of the writing instrument, a direction of motion of the writing instrument, a speed of motion of the writing instrument, an acceleration of motion of the writing instrument, a force acting on the writing instrument, a mode of handling of the writing instrument, and a mode of use of the writing instrument.

In an embodiment, the capturing subsystem may be configured to continuously monitor the tracking data via the capturing subsystem, more specifically wherein the tracking data may comprise a time stamp.

In embodiments, the capturing subsystem may be integrated in the writing instrument and/or in an external device. In an embodiment, the external device may be part of the user interface subsystem.

The capturing subsystem may comprise a digital sheet, more specifically a touchpad, a touch screen, or a graphics tablet.

The capturing subsystem may be configured to capture an image and/or a video of the handwritten text by using the at least one optical sensor. In an embodiment, the capturing subsystem may be further configured to capture a time series of the handwritten text provided by a user of the system, more specifically as writing progresses.

The system may further comprise a data handling subsystem configured to transmit data between the capturing subsystem and the user interface subsystem.

In embodiments, the data handling subsystem may comprise a first data handling subsystem configured to receive and/or transmit data, more specifically wherein the first data handling subsystem may be integrated in the writing instrument and/or in an external device.

The data handling subsystem may comprise a second data handling subsystem configured to receive and/or transmit data to the first data handling subsystem, more specifically wherein the second data handling subsystem may be part of the user interface subsystem.

The capturing subsystem may be configured to generate and transmit tracking data to the first data handling subsystem and/or to the second data handling subsystem.

The processing subsystem may comprise a processing unit configured to process data, more specifically wherein the processing subsystem may be a part of the writing instrument, of the data handling subsystem and/or of the user interface subsystem.

The user interface subsystem may be configured to receive input from a user of the system, more specifically wherein the user interface subsystem may be configured to enable a user selection.

The processing subsystem may be configured to run a writing digitization algorithm configured to generate digital text data based on the tracking data. In embodiments, the writing digitization algorithm may be configured to virtually reproduce the handwritten text based on the tracking data corresponding to the operation of the writing instrument.

In embodiments, the digital text data may comprise one or more of text in terms of a string of at least one character, and/or text in terms of a vector graphic or bitmap.

The processing subsystem may be configured to run a handwriting attribute identification algorithm configured to identify the at least one handwritten text attribute based on the captured digital text data.

The system may further comprise a textual feature attribute database comprising predefined textual feature attributes each having a predefined attribute weighting required to generate a textual feature, or, a link to a textual feature attribute database comprising predefined textual feature attributes each having a predefined attribute weighting.

In addition, the system may comprise a textual feature database comprising a plurality of predefined textual features each having predefined textual feature attributes and predefined attribute weightings, or, a link to a textual feature database comprising a plurality of predefined textual features each having predefined textual feature attributes and predefined attribute weightings.

The processing subsystem may be configured to run a textual feature selection algorithm configured to select relevant predefined textual features, each having associated predefined textual feature attributes and predefined attribute weightings.

In embodiments, the textual feature selection algorithm may be configured to determine relevant predefined textual features by comparing and/or associating the predefined textual feature attributes with the at least one handwritten text attribute. More specifically, the predefined attribute weightings may be altered based on the compared and associated predefined textual feature attributes and at least one handwritten text attribute.

The processing subsystem may be configured to run a textual feature generator network configured to perform a style transfer of the at least one predefined textual feature and to generate the textual feature based on the style transfer.

The processing subsystem may be configured to run a textual feature generator network configured to modify the digital text data with the generated textual feature, more specifically wherein the textual feature generator network may be configured to transform the digital text data to a vector image being transformable based on altered predetermined attribute weightings.

In embodiments, the processing subsystem may be configured to run a rendering algorithm configured to render modified digital text data into feedback data.

The system may be configured to run the computer-implemented method for generating feedback based on a handwritten text according to embodiments described for the first aspect of the present disclosure.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Embodiments of the computer-implemented method and the system for generating feedback based on a handwritten text according to the present disclosure will be described in reference to the drawings as follows.

Figure 1:
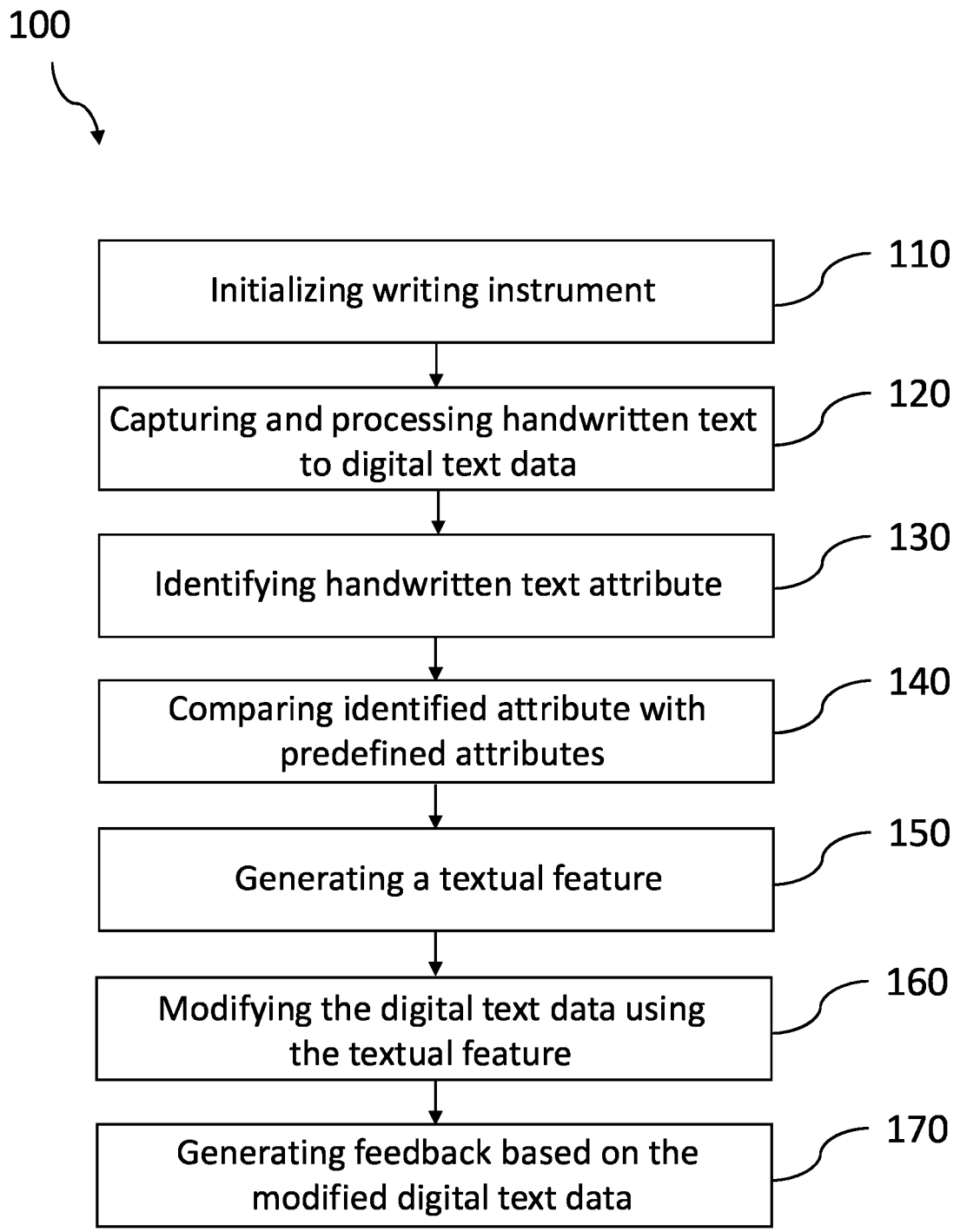
FIG. 1 is an overview of the computer-implemented method according to the first aspect of the present disclosure.

FIG. 1 is an overview of the computer-implemented method 100 according to a first aspect of the present disclosure. The computer-implemented method 100 for generating feedback based on a handwritten text, comprises the steps of initializing 110 a writing instrument 10 to be used in a writing operation comprising a handwritten text, capturing and processing 120 the handwritten text to generate digital text data, and identifying 130 at least one handwritten text attribute associated with the digital text data. Furthermore, the method 100 comprises the steps of comparing 140 the at least one handwritten text attribute with predefined textual feature attributes, generating 150 a textual feature based on the compared at least one handwritten text attribute and predefined textual feature attributes, and modifying 160 the digital text data using the textual feature. In addition, the method 100 comprises the step of generating 170 feedback to a user U based on the modified digital text data.

The method 100 according to the first aspect of the present disclosure enables a user U to receive real-time evolving feedback via the generation of a digital version of what the user U is writing using a textual feature which is modified based on small variances in a handwritten text provided by the user U and associated attributes. User-specific attributes, more specifically the handwritten text attributes, can be continuously extracted from a user's handwritten text and can be used by a textual feature generator network to select and alter predefined (or default) textual features based on the handwritten text attributes. A corresponding feedback can be generated and reproduced to the user U. The described method 100 may provide e.g. that a user U may receive real-time feedback about subtle changes in handwriting, more specifically at performing a handwritten text by using a writing instrument 10. Thereby, handwriting legibility and/or informative feedback on a user's state of mind (e.g., neutral, positive, negative mood or anxiety) for self-reflection may be improved. In detail, the enablement of a continuous feedback referring to a handwritten text performed by a user U and associated subtle changes may lead to accelerated learning of handwriting. Further, the feedback may provide the user U with a self-reflection about the user's mood and emotional state derived from the handwritten text.

The above-mentioned attributes are qualities that can be derived from a user's handwritten text and form fundamental building blocks for creating a textual feature. Handwritten text attributes pertain to the inferred meaning of visual and non-visual characteristics (or physical or psychological characteristics) that are inherent to a way the user U writes. Handwritten text attributes may be derived from, e.g., letter height, time to perform a handwritten text (in detail to perform a letter and/or a word and/or a sentence), time between performing letters or words (e.g., in-air time of the writing instrument 10 during a writing operation by a user), letter spacing, angularity of the handwritten text as will be explained in more detail below. For example, a low letter height, quick writing (low time to perform a handwritten text) and narrow letter spacing may indicate negative emotions of a user U (compared to a handwritten text of a user U having neutral or positive emotions). Predefined textual feature attributes form the fundamental building blocks that define and encompass the visual style of a default textual feature. Each predefined textual feature attribute comprises a predefined attribute weighting which can be altered. Predefined textual feature attributes can include e.g., serif, angularity, dramatic, and/or italic. As an example, a textual feature including angularity or dramatic could result in an angry and emotional feedback. The handwritten attributes, predefined textual feature attributes and the textual feature will be explained in more detail below.

In the embodiments shown, the textual feature may be a font. The feedback may be a visual feedback including an output text. In embodiments, the output text may comprise the font. In other embodiments, the feedback may be an audio feedback (e.g., sound feedback) being reproduced to a user. The handwritten text may be provided by a text written by a user U using the writing instrument 10 on a writing medium, more specifically wherein the handwritten text may be semantically and/or linguistically interpretable with respect to at least one communication language. The writing medium may be a sheet of paper or a digital sheet. The writing instrument 10 may be a ballpoint pen, a fountain pen, a felt-tip pen, a brush, a pencil, or a digital pen. The visual feedback can be displayed to a user U via a user interface subsystem 40 comprising a displaying unit. In case the feedback is an audio feedback, the user interface subsystem 40 may be configured to reproduce audio feedback to a user, e.g., wherein the user interface subsystem 40 may include at least one audio emitting component. For example, the at least one audio emitting component may be a speaker configured to play a sound.

Figure 2:
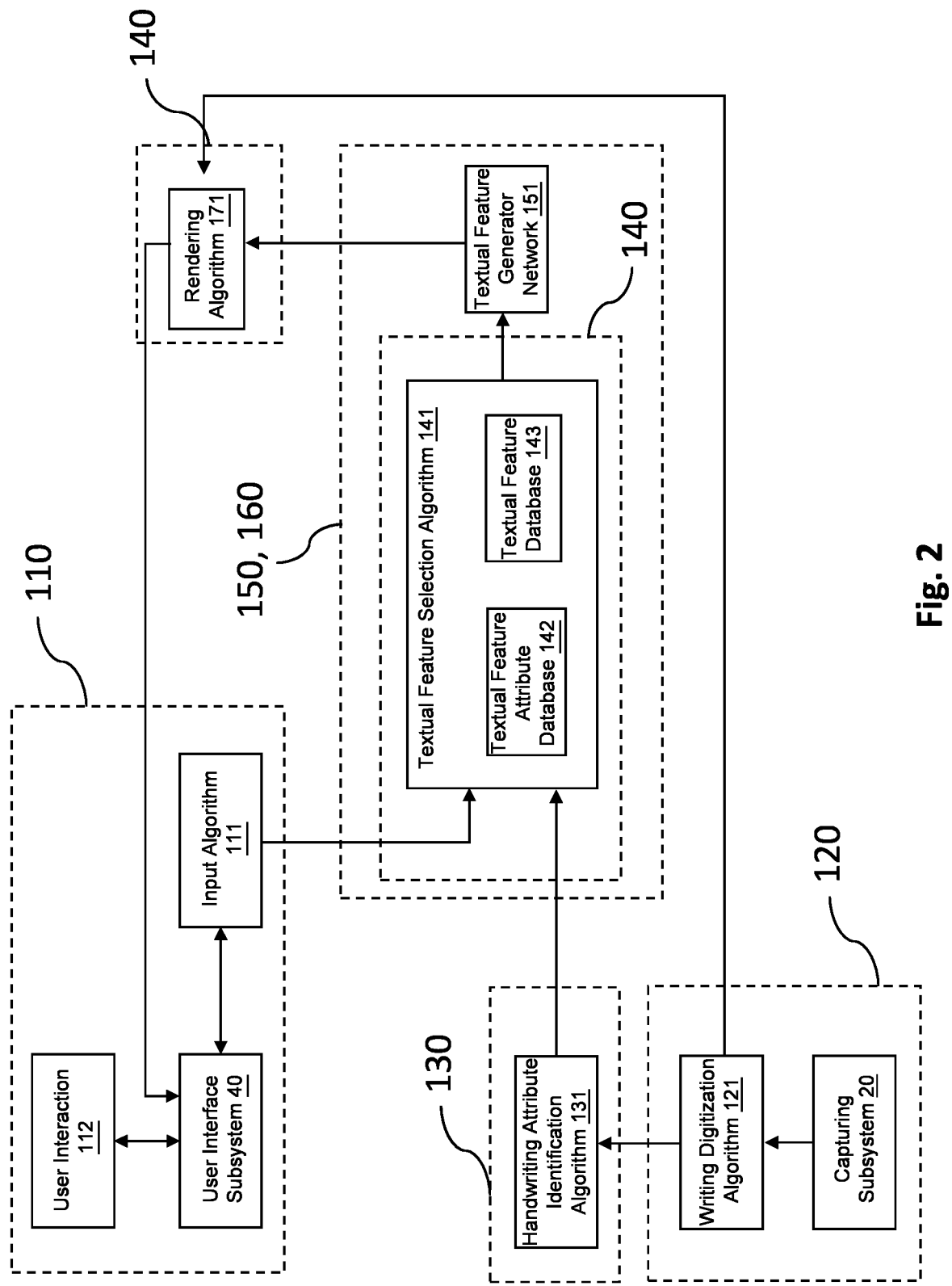
FIGS. 2 and 3 are process flow diagrams of the computer-implemented method.
Figure 3:
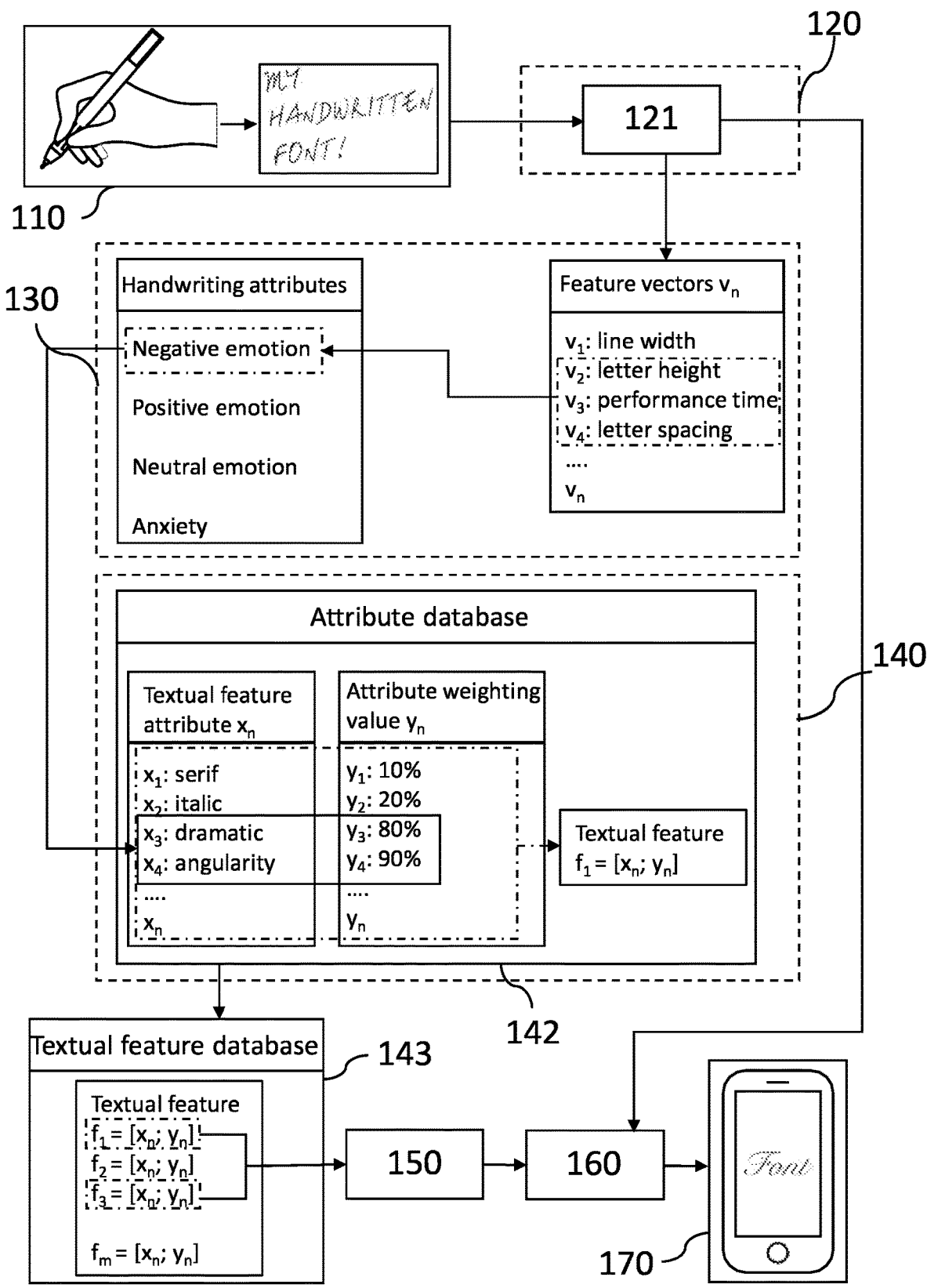

FIGS. 2 and 3 are process flow diagrams of the computer-implemented method 100. The step of initializing 110 the writing instrument 10 comprises capturing input data, more specifically via a user interface subsystem 40. Capturing input data comprises applying an input algorithm 111. The input algorithm 111 may be configured to prompt at least one user interaction 112 via the user interface subsystem 40 guiding a user U to identify at least one preference to be assessed. The identified preference may comprise at least one physical preference and/or at least one psychological preference associated with the handwritten text. The input algorithm 111 may be further configured to receive at least one identified preference via the user interaction 112. The at least one physical preference to be assessed can be the improvement of handwriting legibility or neatness, e.g., wherein the consistency of individual letter height may be assessed by the method 100. Assessing the at least one psychological preference may comprise detecting specific emotional attributes or handwritten style qualities, e.g., alerting the user's attention when their anger increases about a certain topic they are writing about. In embodiments, the input algorithm 111 may be configured to prompt at least one user interaction 112 via the user interface subsystem 40 guiding a user U to start a writing operation and/or to select a writing medium.

Referring to the second step shown in FIGS. 1 to 3, capturing and processing 120 the handwritten text comprises capturing tracking data from a capturing subsystem 20, wherein the capturing subsystem 20 may be configured to generate tracking data of the writing instrument 10 during a writing operation. The tracking data may comprise one or more of motion tracking data of the writing instrument 10, visual data of a writing medium and/or the writing instrument 10, and capacity sensitive surface data of a capacity sensitive surface. The motion tracking data can comprise one or more of a position of the writing instrument 10, a direction of motion of the writing instrument 10, a speed of motion of the writing instrument 10, an acceleration of motion of the writing instrument 10, a force acting on the writing instrument 10, a mode of handling of the writing instrument 10, and a mode of use of the writing instrument 10. Capturing tracking data may comprise continuously monitoring the tracking data via the capturing subsystem 20, more specifically wherein the tracking data may comprise a time stamp. Detailed embodiments of the capturing subsystem 20 will be described with reference to the system 1 below.

As indicated in FIGS. 1 to 3, capturing and processing 120 handwritten text comprises applying a writing digitization algorithm 121 configured to convert tracking data to digital text data. In embodiments, the writing digitization algorithm 121 may be configured to convert tracking data to a set of handwriting feature vectors, and to convert the set of handwriting feature vectors to digital text data via vector-to-character mapping. The set of handwriting feature vectors may, amongst others, comprise one or more of a line width feature vector, a letter height feature vector, a performance time feature vector, a letter spacing feature vector, a cursive feature vector, an angularity feature vector and/or a fluidity feature vector. FIG. 3 illustrates the feature vectors vn being listed and derived from the handwritten text. In embodiments, the digital text data may comprise at least one indexed character, word and/or sentence. The converted characters may be indexed in order to provide word and sentence reconstruction, which may be stored in a memory. The digital text data may be a plain text and may be used for later application and transformation with a generated textual feature, more specifically the font.

Identifying 130 at least one handwritten text attribute associated with the digital text data comprises applying a handwriting attribute identification algorithm 131. The handwriting attribute identification algorithm 131 may be configured to determine at least one handwritten text attribute by processing the digital text data, more specifically the set of handwriting feature vectors. Thereby, the handwriting attribute identification algorithm 131 may be configured to determine at least one relevant handwriting feature vector of the set of handwriting feature vectors based on a dominance of the respective handwriting feature vectors. The dominance may be dependent on the handwritten text, e.g., the dominance may refer to a large letter height, or a large distance between letters of the handwritten text. The handwriting attribute identification algorithm 131 may be configured to select the at least one relevant handwriting feature vector. The at least one handwriting feature vector can be used to determine physical and/or psychological handwritten text attributes. E.g., as shown in FIG. 3, the handwriting attribute "negative emotion" may be quantified by a lower letter height, quicker writing and narrow spacing of letters. The handwriting attribute identification algorithm 131 can be further configured to associate the at least one handwritten text attribute with an attribute weighting, based on the determined relevant feature vectors and their dominance, more specifically wherein the attribute weighting may be determined by feature-to-attribute mapping. The at least one handwritten text attribute may be a physical attribute and/or a psychological attribute. Referring to the example shown in FIG. 3, the handwriting attribute identification algorithm 131 may determine that the handwritten text comprises low letter height, quick writing and narrow spacing of letters and may associate these feature vectors with the handwritten text attribute "negative emotion" of a user U. If the handwritten text comprises high values of angularity captured in the angularity feature vector, the handwritten text attribute may also comprise the physical handwritten text attribute "high angularity", being associated with high attribute weightings for angularity.

Comparing 140 the at least one handwritten text attribute with predefined textual feature attributes comprises applying a textual feature selection algorithm 141. The predefined textual feature attributes can be stored in a textual feature attribute database 142. The textual feature attribute database 142 may comprise predefined attribute weightings for each of the predefined textual feature attributes. In order to generate a textual feature, more specifically a font, predefined textual feature attributes and associated weightings are required. Each predefined textual feature (e.g., a default textual feature) may be defined by the predefined textual feature attributes and their respective weightings. The predefined textual feature attributes may comprise identifiers related to the at least one handwritten text attribute. The identifiers may be the link between psychological handwritten text attributes, e.g, negative emotion, and the predefined textual feature attributes stored in the textual feature attribute database 142. The textual feature selection algorithm 141 can be configured to search and select relevant predefined textual feature attributes associated with the at least one handwritten text attribute based on the identifiers. In the example shown in FIG. 3, the identifiers may indicate, that the handwritten text attribute "negative emotion" is associated with relevant predefined textual feature attributes "angularity" and "dramatic", which will be selected by the textual feature selection algorithm 141.

The textual feature selection algorithm 141 may be configured to alter one or more of the predefined attribute weightings of relevant predefined textual feature attributes based on the at least one handwritten text attribute and/or based on the identified preference. The corresponding weightings of the predefined textual feature attributes may be used as a basis to apply necessary transformations to a reference textual feature based on the handwritten text attributes and/or user preferences. For example, handwritten text attributes relating to positive emotions may have their weightings lowered if a user U wants to be informed only of negative emotions, providing more focused feedback to a user U. Besides the predefined textual feature attributes associated with the at least one handwritten text attribute, a list of default textual feature attributes can be used for creating a reference (or default) textual feature. Thereby, any user-related textual feature changes can be displayed more noticeable. Referring back to the example shown in FIG. 3, the handwritten text attribute "negative emotion" will require high weightings of "angularity" and "dramatic", such that the associated predefined attribute weightings may be altered to high values. Besides the selected predefined textual features attributes and altered predefined attribute weightings, other default textual feature attributes and associated default attribute weightings may be selected to create the textual feature.

Generating 150 the textual feature comprises applying a textual feature selection algorithm 141 configured to select at least one predefined textual feature from a textual feature database 143 comprising a plurality of predefined textual features. Each predefined textual feature may be labelled with predefined textual feature attributes and associated predefined attribute weightings. The textual feature selection algorithm 141 may be configured to select the at least one predefined textual feature based on the at least one handwritten text attribute, the identified preference and/or the relevant predefined textual feature attributes. In other words, the textual feature selection algorithm 141 may be configured to determine which predefined textual features closely match the relevant predefined textual feature attributes and user preferences. In embodiments, a plurality of predefined textual features may be chosen in order to generate the textual feature that is associated with the handwritten text.

As shown in FIG. 3, each predefined textual feature comprises a plurality of predefined textual feature attributes and associated attribute weightings. The textual feature selection algorithm 141 can be configured to select one or more predefined textual features which have high attribute weightings for the predefined textual feature attributes "dramatic" and "angularity". However, as already explained above it should be noted that the respective predefined textual features may also have other default textual feature attributes and associated default attribute weightings. The textual feature selection algorithm 141 can be configured to continuously adapt the at least one predefined textual feature based on a change of the at least one handwritten text attribute, the preference and/or the relevant predefined textual feature attributes. More specifically, the predefined textual feature may be continuously adapted based on altering the one or more predefined attribute weightings. The adaption may provide real-time emphasis changes of the textual feature.

Generating 150 the textual feature comprises applying a textual feature generator network 151 trained to perform a style transfer of the at least one predefined textual feature. The textual feature generator network 151 may be a neural network. The generated textual feature may be generated by taking the at least one predefined textual feature which has predefined textual feature attributes with respective weightings as inputs. By performing the style transfer, new glyph images may be generated. If a plurality of predefined textual features are selected, the textual feature generator network 151 may be configured to interpolate the predefined textual feature attributes and associated (and altered) predefined attribute weightings of the plurality of predefined textual features in order to generate the textual feature.

Modifying 160 the digital text data using the textual feature comprises applying the textual feature generator network 151 configured to transform the digital text data by using the textual feature. More detailed, the textual feature generator network 151 may be configured to transform the digital text data to a vector image being transformable based on altered predetermined textual feature attribute weightings. Such transformations may include as examples: 1) an increase in writing angularity harshness and line weight to portray an "angry" attribute; 2) the inclusion of serifs to portray a "mature" attribute; and/or 3) an increase in cursives in scripted textual features to portray a "casual" attribute. With respect to the embodiment shown in FIG. 3, the handwritten text attribute "negative emotion" may lead to a heavily weighted "angry" textual feature which may increase the harshness of the writing angularity and line weight.

Generating 170 feedback based on the modified digital text data may comprise applying a rendering algorithm 171 configured to render modified digital text data into feedback data and reproducing the feedback data on the user interface subsystem 40. In embodiments, the feedback may be visual feedback and generating 170 feedback to a user based on the modified digital text data may further comprise displaying the visual feedback on the user interface subsystem 40. In this case, the rendering algorithm 171 may be configured to render modified digital text data into visual feedback data.

The described method 100 can comprise or be executable via a computer or network of computers, the computer or network of computers comprising at least one processor and at least one memory. The described procedural logic may be held in the form of executable code in at least one memory and executed by the at least one processor. The systems and subsystems may send data to the at least one processor and, in examples, they may also receive instructions from the at least one processor. The processor may thereby direct user-initiated and/or automatically generated queries to the system. The system is not limited to a particular hardware environment. Thus, distributed devices coupled via a network may perform the techniques described herein. The disclosure also includes electrical signals and computer-readable media defining instructions that, when executed by a processor, implement the techniques described herein. More specifically, the processor as described above can be or can comprise the data processing unit.

Figure 4:
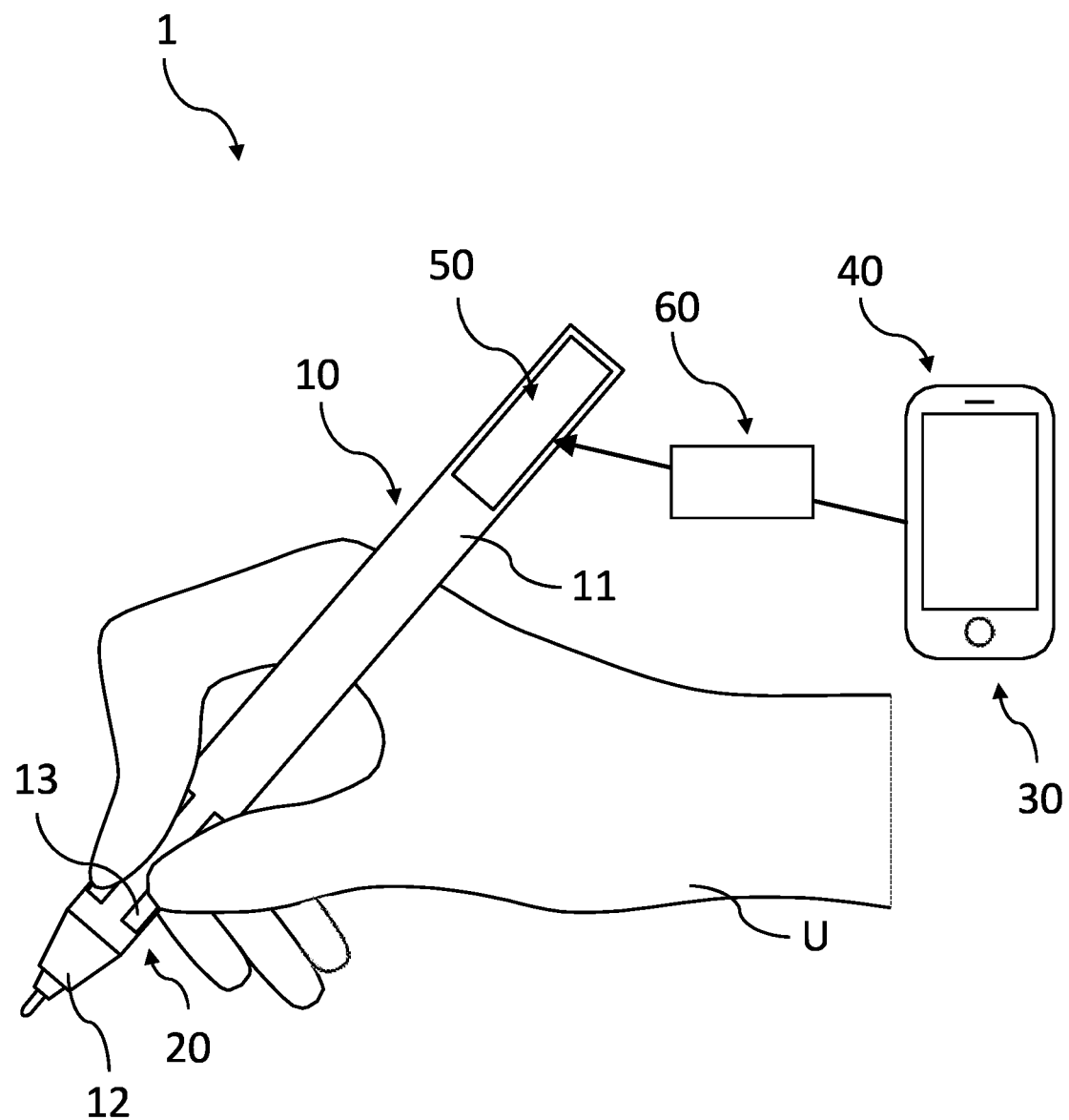
FIG. 4 is a schematic view of the writing instrument system according to the second aspect of the present disclosure.

FIG. 4 is a schematic view of the system 1 according to the second aspect of the present disclosure, which is configured to run the above-described computer-implemented method 100. The system 1 for generating feedback based on a handwritten text, comprises a writing instrument 10 configured to be operated by a user U to perform a handwritten text and a capturing subsystem 20 configured to capture the handwritten text. The system 1 further comprises a processing subsystem 30 configured to process the handwritten text to digital text data, to identify at least one handwritten text attribute associated with the digital text data, to compare the at least one handwritten text attribute with predefined textual feature attributes, to generate a textual feature based on the compared at least one handwritten text attribute and predefined textual feature attributes, and to modify the digital text data using the textual feature. In addition, the system 1 comprises a user interface subsystem 40 configured to generate feedback based on the modified digital text data and to reproduce the generated feedback to the user U. The textual feature may be a font. In embodiments, the feedback may be a visual feedback including an output text, more specifically wherein the output text may comprise the font. The system 1 may be a writing instrument system for generating feedback based on a handwritten text. In other embodiments, the feedback may be an audio feedback. In this case, the user interface subsystem 40 may be configured to reproduce the generated audio feedback to the user via at least one audio emitting component. E.g., the at least one audio emitting component may be a speaker configured to play a sound.

As indicated in FIG. 4, the system 1 further comprises a data handling subsystem 50, 60 configured to transmit data between the capturing subsystem 20 and the user interface subsystem 40. The data handling subsystem 50, 60 comprises a first data handling subsystem 50 configured to receive and/or transmit data. In embodiments, the first data handling subsystem 50 can be integrated in the writing instrument 10 and/or in an external device. The data handling subsystem 50, 60 comprises a second data handling subsystem 60 configured to receive and/or transmit data to the first data handling subsystem 50. In an embodiment, the second data handling subsystem 60 may be part of the user interface subsystem 40.

The writing instrument 10 is configured to be used on a writing medium, more specifically wherein the writing medium can be a sheet of paper or a digital sheet. In embodiments, the writing instrument 10 can be a ballpoint pen, a fountain pen, a felt-tip pen, a brush, a pencil, or a digital pen (e.g., a smart pen). The writing instrument 10 may comprise a body 11. The body 11 may be cylindrical, more specifically wherein the body 11 comprises a circular cross-section. However, in embodiments, the body 11 may have a triangular, quadrangular, rectangular or polygonal cross-section. The body 11 may comprise a nib 12 connected to a first end of the body 11, which can be connected to the body 11 by positively locking, non-positively locking, and/or adhesive bond. In embodiments, the nib may be releasably connected to the body 11, or, integrally formed with the body 11. The body 11 may comprise a second end on an opposite side of the body 11 with respect to the first end. As shown in FIG. 4, the first data handling subsystem 50 may be arranged in the body 11. More specifically, the first data handling subsystem 50 may be arranged proximate the second end of the body 11. In other embodiments, the first data handling subsystem 50 may be arranged proximate the first end and/or proximate the 12. In other embodiments, the writing instrument 10 may be used together with an external device.

Furthermore, the body 11 may comprise a grip 13 arranged proximate the nib 12 (and/or the first end). The grip 13 may lead to easier handling of the writing instrument 10 for a user U during a writing operation. In embodiments, the grip 13 can be arranged on an outer circumferential surface of the body 11 and can extend into the body 11. The grip 13 can be arranged on the body 11 from a position proximate the first end at least partially over a length of the body 11 towards the second end. In embodiments, the grip 13 can be arranged over the whole circumference of the body 11. In other embodiments, the grip can comprise a plurality of grip elements extending at least partially over the circumference of the body 11, respectively. During a writing operation, the user U can hold the writing instrument 10 at the grip 13. In an example, the grip may comprise two grip elements separated to each other with respect to the circumference of the body 11. In another embodiment, the grip 13 may comprise three grip elements separated to each other with respect to the circumference of the body 11 by an angle of about 120°.

In embodiments, the body 11 can be a tubular body and the writing instrument 10 may comprise a fluid reservoir for storing a fluid composition, e.g., ink. The nib 12 may be in fluid communication with the fluid reservoir. In some embodiments, the fluid communication may be established by a channel connecting the reservoir and the nib 12 or by the nib 12 comprising a wick-like or porous element which extends into the reservoir and is configured to transport fluid (more specifically ink) from the reservoir to the nib 12. In embodiments, the writing instrument 10, more specifically the nib 12, may further comprise a valve element (not shown) configured to switch between a fluid flow preventing condition and a fluid flow enabling condition. The valve element may be configured to control flow of the fluid composition from the reservoir to or towards a writing medium. However, in case the writing instrument 10 is provided as a smart device, e.g., a smart pen, the fluid reservoir and/or the fluid composition and/or the valve element may be omitted.

The user interface subsystem 40 may comprise a displaying unit, more specifically wherein the displaying unit may comprise a capacity sensitive surface. The capturing subsystem 20 is configured to generate tracking data of the writing instrument 10 during a writing operation. In other words, the tracking data can refer, e.g., to a specific position, orientation and/or movement of the writing instrument 10 in a writing operation with respect to a writing medium. The tracking data may comprise one or more of motion tracking data of the writing instrument 10, visual data of a writing medium and/or the writing instrument 10, and capacity sensitive surface data of a capacity sensitive surface. Thus, the tracking data may not only include motion data of the writing instrument 10, but also visual data of the handwritten text performed by the writing instrument 10 (used by the user U) and/or capacity sensitive surface data of the handwritten text performed with the writing instrument 10 on a digital sheet. The capturing subsystem 20 may be configured to continuously monitor the tracking data via the capturing subsystem 20. In embodiments, the tracking data may comprise a time stamp.

The capturing subsystem 20 may be integrated in the writing instrument 10 and/or in an external device. In embodiments, the external device may be part of the user interface subsystem 40. In an embodiment, the capturing subsystem 20 may comprise a digital sheet, more specifically a touchpad, a touch screen, or a graphics tablet. The capturing subsystem 20 may be further configured to capture a time series of the handwritten text provided by a user U of the system 1, more specifically as a writing operation progresses. The capturing subsystem 20 may be configured to generate and transmit tracking data of the writing instrument 10 to the first data handling subsystem 50 and/or to the second data handling subsystem 60. In embodiments, the capturing subsystem 20 can be arranged in the body 11 of the writing instrument 10. The capturing subsystem 20 may be arranged in the body 11 between first end and second end and/or in the nib 12. More specifically, the capturing subsystem 20 may be arranged along the body 11 between nib 12 and the first data handling subsystem 50 and/or between the first data handling subsystem 50 and second end. As mentioned above, the capturing subsystem 50 can also be integrated in the external device. Thus, in embodiments, more than one capturing subsystem 50 can be provided. The external device can be a digital device including a capacity sensitive surface with capacity sensing sensors (e.g., touch screen). During a writing operation, the writing instrument 10 may be operated on the capacity sensitive surface of the external device, wherein tracking data, more specifically capacity sensitive surface data, may be generated when the writing instrument 10 is in contact with the capacity sensitive surface. The external device can be configured to transmit and/or receive data to the first data handling subsystem 50 and/or to the second data handling subsystem 60. In other embodiments, the external device can be an image capturing device, e.g., a digital camera and/or a smartphone. In embodiments, one or more external devices can be provided.

In embodiments, the capturing subsystem 20 may comprise one or more sensors configured to generate tracking data of the writing instrument 10. The one or more sensors may include a capacity sensitive surface sensor, an accelerometer, a gyroscope, a magnetometer, a force sensor, and/or an optical sensor. The motion tracking data may comprise one or more of a position of the writing instrument 10, a direction of motion of the writing instrument 10, a speed of motion of the writing instrument 10, an acceleration of motion of the writing instrument 10, a force acting on the writing instrument 10, a mode of handling of the writing instrument 10, and a mode of use of the writing instrument 10. The accelerometer may generate acceleration data of the writing instrument 10 that can be used for positional dead reckoning, which is a process of calculating a current position of the writing instrument 10 by using a previously determined position, estimations of speed, heading direction and course over elapsed time. The rotational sensor, more specifically the gyroscope, can be configured to measure orientation and/or angular velocity of the writing instrument 10 with respect to the writing medium. In embodiments, the one or more sensors can include the at least one optical sensor. The capturing subsystem 20 may be configured to capture an image and/or a video of the handwritten text by using the at least one optical sensor. The at least one optical sensor can be combined with computer vision for the tracking of the writing instrument 10 by processing optical data. In embodiments, the at least one optical sensor can be arranged proximate the nib of the writing instrument (e.g., a camera). In an embodiment, the optical sensor may be a digital camera integrated in the external device, e.g., in a smart phone, and/or integrated the user interface subsystem 40.

The processing subsystem 30 may comprise a processing unit configured to process data, more specifically wherein the processing subsystem 30 can be integrated in (or a part of) the writing instrument 10, the data handling subsystem 50, 60 and/or the user interface subsystem 40. The data processing unit can be configured to process the data generated by the user interface subsystem 40. As mentioned above, the user interface subsystem 40 can comprise the displaying unit that is configured to provide a feedback, more specifically visual feedback, to a user U. The user interface subsystem 40 can be configured to receive input from a user U of the system 1, more specifically wherein the user interface subsystem 40 can be configured to enable a user selection. Furthermore, the user interface subsystem 40 may comprise a capacity sensitive surface (e.g., touch screen) via which the user U may select the writing medium and/or identify a preference as described above.

The system 1 may further comprise a first power source, wherein the first power source can be configured to supply power to the first data handling subsystem 50 and/or the capturing subsystem 20. The first power source may be arranged in the body 11 and can be a rechargeable battery. In other embodiments, the power source can be arranged as an external component with respect to the writing instrument 10 and may be connected to the writing instrument 10, more specifically to the first data handling subsystem 50 and/or the capturing subsystem 20 via wires.

In embodiments, the processing subsystem 30 may be configured to run a writing digitization algorithm 121 configured to generate digital text data based on the tracking data. As stated above, tracking data includes motion tracking data of the writing instrument 10, visual data of the handwritten text provided by image processing, and/or the input on the digital sheet, more specifically capacity sensitive sensor data generated by the writing instrument being operated on a capacity sensitive surface. The digital text data may be in the form of a plain text for later application and transformation with a generated textual feature, more specifically a generated font. In embodiments, the writing digitization algorithm 121 may be configured to virtually reproduce the handwritten text based on the tracking data corresponding to the operation of the writing instrument 10. The digital text data may be based on the tracking data and may include vectors for a range of handwritten text parameters (e.g., pressure, direction, acceleration) for analysis of features such as, e.g., cursives, angularity and fluidity. The digital text data may comprise one or more of text in terms of a string of at least one character, and/or text in terms of a vector graphic or bitmap.

In embodiments, the processing subsystem 30 may be configured to run a handwriting attribute identification algorithm 131 configured to identify the at least one handwritten text attribute based on the captured digital text data as described for the method above.

The system 1 may further comprise a textual feature attribute database 142 comprising predefined textual feature attributes each having a predefined attribute weighting required to generate a textual feature, or, a link to a textual feature attribute database 142 comprising predefined textual feature attributes each having a predefined attribute weighting. In embodiments, the system 1 may further comprise a textual feature database 143 comprising a plurality of predefined textual features each having predefined textual feature attributes and predefined attribute weightings, or, a link to a textual feature database 143 comprising a plurality of predefined textual features each having predefined textual feature attributes and predefined attribute weightings.

The textual feature selection algorithm 141 may be configured to determine relevant predefined textual features by comparing and/or associating the predefined textual feature attributes with the at least one handwritten text attribute, more specifically wherein the predefined attribute weightings may be altered based on the compared and associated predefined textual feature attributes and at least one handwritten text attribute.

Furthermore, the processing subsystem 30 may be configured to run a textual feature generator network 151 configured to perform a style transfer of the at least one predefined textual feature and to generate the textual feature based on the style transfer. The processing subsystem 30 may be configured to run the textual feature generator network 151 configured to modify the digital text data with the generated textual feature, more specifically wherein the textual feature generator network 151 may be configured to transform the digital text data to a vector image being transformable based on altered predetermined attribute weightings.

In embodiments, the processing subsystem 30 may be configured to run a rendering algorithm 171 configured to render modified digital text data into feedback data.

As mentioned, the system 1 is configured to run the above-described computer-implemented method 100. More specifically, the processing subsystem 30 may be configured to execute the algorithms described for the computer-implemented method 100. It should be noted that the features and embodiments described for the computer-implemented method 100 may also apply to the system 1 and vice versa.

Although the present invention has been described above and is defined in the attached claims, it should be understood that the invention may alternatively be defined in accordance with the following embodiments:

1. A computer-implemented method (100) for generating feedback based on a handwritten text, comprising the steps of:
   - initializing (110) a writing instrument (10) to be used in a writing operation comprising a handwritten text;
   - capturing and processing (120) the handwritten text to generate digital text data; identifying (130) at least one handwritten text attribute associated with the digital text data;
   - comparing (140) the at least one handwritten text attribute with predefined textual feature attributes;
   - generating (150) a textual feature based on the compared at least one handwritten text attribute and predefined textual feature attributes;
   - modifying (160) the digital text data using the textual feature; and
   - generating (170) feedback to a user (U) based on the modified digital text data.
2. The method (100) according to embodiment 1, wherein the textual feature is a font.
3. The method (100) according to embodiment 1 or embodiment 2, wherein the feedback is a visual feedback including an output text.
4. The method (100) according to any one of the preceding embodiments, wherein the handwritten text is provided by a text written by a user (U) using the writing instrument (10) on a writing medium, more specifically wherein the handwritten text is semantically and/or linguistically interpretable with respect to at least one communication language.
5. The method (100) according to embodiment 4, wherein the writing medium is a sheet of paper or a digital sheet.
6. The method (100) according to any one of the preceding embodiments, wherein the writing instrument (10) is a ballpoint pen, a fountain pen, a felt-tip pen, a brush, a pencil, or a digital pen.
7. The method (100) according to any one of the preceding embodiments, wherein the feedback is a visual feedback displayed to a user (U) via a user interface subsystem (40) comprising a displaying unit.
8. The method (100) according to embodiment 7, wherein initializing (110) the writing instrument (10) comprises capturing input data, more specifically via the user interface subsystem (40).
9. The method (100) according to embodiment 8, wherein capturing input data comprises applying an input algorithm (111).
10. The method (100) according to embodiment 9, wherein the input algorithm (111) is configured to prompt at least one user interaction (112) via the user interface subsystem (40) guiding a user (U) to identify at least one preference to be assessed, more specifically wherein the identified preference comprises at least one physical preference and/or at least one psychological preference associated with the handwritten text, and to receive at least one identified preference via the user interaction (112).
11. The method (100) according to embodiment 9 or embodiment 10, wherein the input algorithm (112) is configured to prompt at least one user interaction (112) via the user interface subsystem (40) guiding a user (U) to start a writing operation and/or to select a writing medium.
12. The method (100) according to any one of the preceding embodiments, wherein capturing and processing (120) the handwritten text comprises capturing tracking data from a capturing subsystem (20), wherein the capturing subsystem (20) is configured to generate tracking data of the writing instrument (10) during a writing operation.
13. The method (100) according to embodiment 12, wherein the tracking data comprises one or more of motion tracking data of the writing instrument (10), visual data of a writing medium and/or the writing instrument (10), and capacity sensitive surface data of a capacity sensitive surface.
14. The method (100) according to embodiment 12 or embodiment 13, wherein the capturing subsystem (20) comprises one or more sensors including a capacity sensitive surface, an accelerometer, a gyroscope, a magnetometer, a force sensor, and/or an optical sensor.
15. The method (100) according to embodiment 13 or embodiment 14, wherein the motion tracking data comprises one or more of a position of the writing instrument (10), a direction of motion of the writing instrument (10), a speed of motion of the writing instrument (10), an acceleration of motion of the writing instrument (10), a force acting on the writing instrument (10), a mode of handling of the writing instrument (10), a mode of use of the writing instrument (10).
16. The method (100) according to any one of embodiments 12 to 15, wherein capturing tracking data comprises continuously monitoring the tracking data via the capturing subsystem (20), more specifically wherein the tracking data comprises a time stamp.
17. The method (100) according to any one of embodiments 12 to 16, wherein the capturing subsystem (20) is integrated in the writing instrument (10) and/or in an external device.
18. The method (100) according to embodiment 17 and embodiment 7, wherein the external device is part of the user interface subsystem (40).
19. The method (100) according to any one of embodiments 12 to 18, wherein the capturing subsystem (20) comprises a digital sheet, more specifically a touchpad, a touch screen, or a graphics tablet.
20. The method (100) according to any one of embodiments 12 to 19, wherein capturing and processing (120) handwritten text comprises applying a writing digitization algorithm (121) configured to convert tracking data to digital text data.
21. The method (100) according to embodiment 20, wherein the writing digitization algorithm (121) is configured to convert tracking data to a set of handwriting feature vectors, and to convert the set of handwriting feature vectors to digital text data via vector-to-character mapping.
22. The method (100) according to embodiment 21, wherein the set of handwriting feature vectors comprise one or more of a line width feature vector, a letter height feature vector, a performance time feature vector, a letter spacing feature vector, a cursive feature vector, an angularity feature vector and/or a fluidity feature vector.
23. The method (100) according to embodiment 21 or embodiment 22, wherein the digital text data comprises at least one indexed character, word and/or sentence.
24. The method (100) according to any one of the preceding embodiments, wherein identifying (130) at least one handwritten text attribute associated with the digital text data comprises applying a handwriting attribute identification algorithm (131).

25. The method (100) according to embodiment 24, when dependent on embodiment 21, wherein the handwriting attribute identification algorithm (131) is configured to determine at least one handwritten text attribute by processing the digital text data, more specifically the set of handwriting feature vectors.

26. The method (100) according to embodiment 25, wherein the handwriting attribute identification algorithm (131) is configured to determine at least one relevant handwriting feature vector of the set of handwriting feature vectors based on a dominance of the respective handwriting feature vectors.

27. The method (100) according to embodiment 26, wherein the handwriting attribute identification algorithm (131) is configured to select the at least one relevant handwriting feature vector.

28. The method (100) according to embodiment 26 or embodiment 27, wherein the handwriting attribute identification algorithm (131) is configured to associate the at least one handwritten text attribute with an attribute weighting, based on the determined relevant feature vectors and their dominance, more specifically wherein the attribute weighting is determined by feature-to-attribute mapping.

29. The method (100) according to any one of embodiments 25 to 28, wherein the at least one handwritten text attribute comprises a physical attribute and/or a psychological attribute.

30. The method (100) according to any one of the preceding embodiments, wherein comparing (140) the at least one handwritten text attribute with predefined textual feature attributes comprises applying a textual feature selection algorithm (141).

31. The method (100) according to any one of the preceding embodiments, wherein the predefined textual feature attributes are stored in a textual feature attribute database (142), and wherein the textual feature attribute database (142) comprises predefined attribute weightings for each of the predefined textual feature attributes.

32. The method (100) according to embodiment 30 or embodiment 31, wherein the predefined textual feature attributes comprise identifiers related to the at least one handwritten text attribute, and wherein the textual feature selection algorithm (141) is configured to search and select relevant predefined textual feature attributes associated with the at least one handwritten text attribute based on the identifiers.

33. The method (100) according to embodiments 32 and embodiment 10, wherein the textual feature selection algorithm (141) is configured to alter one or more of the predefined attribute weightings of relevant predefined textual feature attributes based on the at least one handwritten text attribute and/or based on the identified preference.

34. The method (100) according to any one of the preceding embodiments, wherein generating the textual feature comprises applying a textual feature selection algorithm (141) configured to select at least one predefined textual feature from a textual feature database (143) comprising a plurality of predefined textual features.

35. The method (100) according to embodiment 34 and embodiment 10, wherein the textual feature selection algorithm (141) is configured to select the at least one predefined textual feature based on the at least one handwritten text attribute, the identified preference and/or the relevant predefined textual feature attributes.

36. The method (100) according to embodiment 34 and embodiment 10 or embodiment 35, wherein the textual feature selection algorithm (141) is configured to continuously adapt the at least one predefined textual feature based on a change of the at least one handwritten text attribute, the preference and/or the relevant predefined textual feature attributes.

37. The method (100) according to any one of embodiments 34 to 36, wherein generating (150) the textual feature comprises applying a textual feature generator network (151) trained to perform a style transfer of the at least one predefined textual feature.

38. The method (100) according to embodiment 37, wherein modifying (160) the digital text data using the textual feature comprises applying the textual feature generator network (151) configured to transform the digital text data by using the textual feature.

39. The method (100) according to embodiment 38, wherein the textual feature generator network (151) is configured to transform the digital text data to a vector image being transformable based on altered predetermined textual feature attribute weightings.

40. The method (100) according to any one of the preceding embodiments, wherein generating (170) feedback to a user based on the modified digital text data comprises applying a rendering algorithm (171) configured to render modified digital text data into feedback data and reproducing the feedback data on the user interface subsystem (40).

41. The method (100) according to any one of the preceding claims, wherein the feedback is a visual feedback, and wherein generating (170) feedback to a user based on the modified digital text data further comprises displaying the visual feedback on the user interface subsystem (40).

42. A system (1) for generating feedback based on a handwritten text, comprising: a writing instrument (10) configured to be operated by a user (U) to perform a handwritten text;
a capturing subsystem (20) configured to capture the handwritten text;
a processing subsystem (30) configured
to process the handwritten text to digital text data,
to identify at least one handwritten text attribute associated with the digital text data,
to compare the at least one handwritten text attribute with predefined textual feature attributes,
to generate a textual feature based on the compared at least one handwritten text attribute and predefined textual feature attributes, and
to modify the digital text data using the textual feature; and
a user interface subsystem (40) configured to generate feedback based on the modified digital text data and to reproduce the generated feedback to the user (U).

43. The system (1) according to embodiment 42, wherein the textual feature is a font.

44. The system (1) according to embodiment 42 or embodiment 43, wherein the feedback is a visual feedback including an output text.

45. The system (1) according to any one of embodiments 42 to 44, wherein the writing instrument (10) is configured to be used on a writing medium, more specifically wherein the writing medium is a sheet of paper or a digital sheet.
46. The system (1) according to any one of embodiments 42 to 45, wherein the writing instrument (10) is a ballpoint pen, a fountain pen, a felt-tip pen, a brush, a pencil, or a digital pen.
47. The system (1) according to any one of embodiments 42 to 46, wherein the user interface subsystem (40) comprises a displaying unit, more specifically wherein the displaying unit comprises a capacity sensitive surface.
48. The system (1) according to any one of embodiments 42 to 47, wherein the capturing subsystem (20) is configured to generate tracking data of the writing instrument (10) during a writing operation.
49. The system (1) according to embodiment 48, wherein the tracking data comprises one or more of motion tracking data of the writing instrument (10), visual data of a writing medium and/or the writing instrument (10), and capacity sensitive surface data of a capacity sensitive surface.
50. The system (1) according to any one of embodiments 42 to 49, wherein the capturing subsystem (20) comprises one or more sensors including a capacity sensitive surface, an accelerometer, a gyroscope, a magnetometer, a force sensor, and/or an optical sensor.
51. The system (1) according to embodiment 49 or embodiment 50, wherein the motion tracking data comprises one or more of a position of the writing instrument (10), a direction of motion of the writing instrument (10), a speed of motion of the writing instrument (10), an acceleration of motion of the writing instrument (10), a force acting on the writing instrument (10), a mode of handling of the writing instrument (10), and a mode of use of the writing instrument (10).
52. The system (1) according to any one of embodiments 48 to 51, wherein the capturing subsystem (20) is configured to continuously monitor the tracking data via the capturing subsystem (20), more specifically wherein the tracking data comprises a time stamp.
53. The system (1) according to any one of embodiments 42 to 52, wherein the capturing subsystem (20) is integrated in the writing instrument (10) and/or in an external device.
54. The system (1) according to embodiment 53, wherein the external device is part of the user interface subsystem (40).
55. The system (1) according to any one of embodiments 42 to 54, wherein the capturing subsystem (20) comprises a digital sheet, more specifically a touchpad, a touch screen, or a graphics tablet.
56. The system (1) according to any one of embodiments 50 to 55, wherein the capturing subsystem (20) is configured to capture an image and/or a video of the handwritten text by using the at least one optical sensor.
57. The system (1) according to embodiment any one of embodiments 42 to 56, wherein the capturing subsystem (20) is further configured to capture a time series of the handwritten text provided by a user of the system (1), more specifically as writing progresses.
58. The system (1) according to any one of embodiments 42 to 57, further comprising a data handling subsystem (50, 60) configured to transmit data between the capturing subsystem (20) and the user interface subsystem (40).
59. The system (1) according to embodiment 58, wherein the data handling subsystem (50, 60) comprises a first data handling subsystem (50) configured to receive and/or transmit data, more specifically wherein the first data handling subsystem (50) is integrated in the writing instrument (10) and/or in an external device.
60. The system (1) according to embodiment 58 or embodiment 59, wherein the data handling subsystem (50, 60) comprises a second data handling subsystem (60) configured to receive and/or transmit data to the first data handling subsystem (50), more specifically wherein the second data handling subsystem (60) is part of the user interface subsystem (40).
61. The system (1) according to embodiment 60, wherein the capturing subsystem (20) is configured to generate and transmit tracking data to the first data handling subsystem (50) and/or to the second data handling subsystem (60).
62. The system (1) according to any one of embodiments 58 to 61, wherein the processing subsystem (30) comprises a processing unit configured to process data, more specifically wherein the processing subsystem (30) is a part of the writing instrument (10), of the data handling subsystem (50, 60) and/or of the user interface subsystem (40).
63. The system (1) according to any one of embodiments 42 to 62, wherein the user interface subsystem (40) is configured to receive input from a user (U) of the system (1), more specifically wherein the user interface subsystem (40) is configured to enable a user selection.
64. The system (1) according to any one of embodiments 48 to 63, wherein the processing subsystem (30) is configured to run a writing digitization algorithm (121) configured to generate digital text data based on the tracking data.
65. The system (1) according to embodiment 64, wherein the writing digitization algorithm (121) is configured to virtually reproduce the handwritten text based on the tracking data corresponding to the operation of the writing instrument (10).
66. The system (1) according to any one of embodiments 42 to 65, wherein the digital text data comprises one or more of text in terms of a string of at least one character, and/or text in terms of a vector graphic or bitmap.
67. The system (1) according to any one of embodiments 42 to 66, wherein the processing subsystem (30) is configured to run a handwriting attribute identification algorithm (131) configured to identify the at least one handwritten text attribute based on the captured digital text data.
68. The system (1) according to any one of embodiments 42 to 67, further comprising a textual feature attribute database (142) comprising predefined textual feature attributes each having a predefined attribute weighting required to generate a textual feature, or, a link to a textual feature attribute database (142) comprising predefined textual feature attributes each having a predefined attribute weighting.
69. The system (1) according to any one of embodiments 42 to 68, further comprising a textual feature database (143) comprising a plurality of predefined textual features each having predefined textual feature attributes and predefined attribute weightings, or, a link to a textual feature database (143) comprising a plurality of predefined textual features each having predefined textual feature attributes and predefined attribute weightings.

70. The system (1) according to any one of embodiments 42 to 69, wherein the processing subsystem (20) is configured to run a textual feature selection algorithm (141) configured to select relevant predefined textual features, each having associated predefined textual feature attributes and predefined attribute weightings.

71. The system (1) according to embodiment 70, wherein the textual feature selection algorithm (141) is configured to determine relevant predefined textual features by comparing and/or associating the predefined textual feature attributes with the at least one handwritten text attribute, more specifically wherein the predefined attribute weightings are altered based on the compared and associated predefined textual feature attributes and at least one handwritten text attribute.

72. The system (1) according to any one of embodiments 42 to 71, wherein the processing subsystem (30) is configured to run a textual feature generator network (151) configured to perform a style transfer of the at least one predefined textual feature and to generate the textual feature based on the style transfer.

73. The system (1) according to any one of embodiments 42 to 72, wherein the processing subsystem (30) is configured to run a textual feature generator network (151) configured to modify the digital text data with the generated textual feature, more specifically wherein the textual feature generator network (151) is configured to transform the digital text data to a vector image being transformable based on altered predetermined attribute weightings.

74. The system (1) according to any one of embodiments 42 to 73, wherein the processing subsystem (30) is configured to run a rendering algorithm (171) configured to render modified digital text data into feedback data.

75. The system (1) according to any one of embodiments 42 to 74, wherein the system (1) is configured to run the computer-implemented method (100) for generating feedback based on a handwritten text according to any one of embodiments 1 to 41.

| REFERENCE NUMERALS | |
|---|---|
| U user | 121 writing digitization algorithm |
| 1 system | 130 identifying at least one handwritten text attribute |
| 10 writing instrument | |
| 11 body | 131 handwriting attribute identification algorithm |
| 12 nib | |
| 13 grip | 140 comparing the at least one handwritten text attribute with predefined textual feature attributes |
| 20 capturing subsystem | |
| 30 processing subsystem | |
| 40 user interface subsystem | |
| 50 first data handling subsystem | 141 textual feature selection algorithm |
| 60 second data handling subsystem | 142 textual feature attribute database |
| | 143 textual feature database |
| 100 computer-implemented method | 150 generating a textual feature |
| 110 initializing a writing instrument | 151 textual feature generator network |
| 111 input algorithm | 160 modifying the digital text data using the textual feature |
| 112 user interaction | |
| 120 capturing and processing handwritten text | 170 generating feedback |
| | 171 rendering algorithm |

The invention claimed is:

1. A computer-implemented method for generating feedback based on a handwritten text, comprising steps of:

initializing a writing instrument to be used in a writing operation comprising the handwritten text;
capturing and processing the handwritten text to generate digital text data by applying a writing digitization algorithm, wherein applying the writing digitization algorithm includes converting tracking data to a set of handwriting feature vectors, and converting the set of handwriting feature vectors to the digital text data via vector-to-character mapping;
identifying at least one handwritten text attribute associated with the digital text data;
comparing the at least one handwritten text attribute with predefined textual feature attributes;
generating a textual feature based on the compared at least one handwritten text attribute and the predefined textual feature attributes, wherein generating the textual feature comprises applying a textual feature generator network trained to perform a style transfer of the predefined textual feature attributes;
modifying the digital text data using the textual feature; and
generating the feedback to a user (U) based on the modified digital text data.

2. The method according to claim 1, wherein identifying the at least one handwritten text attribute associated with the digital text data comprises applying a handwriting attribute identification algorithm that determines at least one relevant handwriting feature vector of the set of handwriting feature vectors based on a dominance of respective handwriting feature vectors.

3. The method according to claim 1, wherein initializing the writing instrument comprises capturing input data.

4. The method according to claim 3, wherein capturing the input data comprises applying an input algorithm.

5. The method according to claim 1, wherein capturing and processing the handwritten text comprises capturing the tracking data from a capturing subsystem, wherein the capturing subsystem is configured to generate the tracking data of the writing instrument during the writing operation.

6. The method according to claim 5, wherein the capturing subsystem comprises one or more sensors including a capacity sensitive surface, an accelerometer, a gyroscope, a magnetometer, a force sensor, and/or an optical sensor.

7. The method according to claim 5, wherein the tracking data comprises motion tracking data of the writing instrument, and wherein the motion tracking data comprises one or more of a position of the writing instrument, a direction of motion of the writing instrument, a speed of the motion of the writing instrument, an acceleration of the motion of the writing instrument, a force acting on the writing instrument, a mode of handling of the writing instrument, the mode of use of the writing instrument.

8. The method according to claim 1, wherein comparing the at least one handwritten text attribute with the predefined textual feature attributes comprises applying a textual feature selection algorithm.

9. The method according to claim 8, wherein the predefined textual feature attributes are stored in a textual feature attribute database, and wherein the textual feature attribute database comprises predefined attribute weightings for each of the predefined textual feature attributes.

10. The method according to claim 9, wherein the textual feature selection algorithm is configured to alter one or more of the predefined attribute weightings of relevant predefined textual feature attributes based on the at least one handwritten text attribute and/or based on an identified preference.

11. A system for generating feedback based on a handwritten text, comprising:
- a writing instrument configured to be operated by a user (U) to perform the handwritten text;
- a capturing subsystem configured to capture the handwritten text;
- a processing subsystem configured to:
- process the handwritten text to digital text data by applying a writing digitization algorithm, wherein the writing digitization algorithm is configured to convert tracking data to a set of handwriting feature vectors, and convert the set of handwriting feature vectors to the digital text data via vector-to-character mapping;
- identify at least one handwritten text attribute associated with the digital text data;
- compare the at least one handwritten text attribute with predefined textual feature attributes;
- generate a textual feature based on the compared at least one handwritten text attribute and the predefined textual feature attributes, wherein generating the textual feature comprises applying a textual feature generator network trained to perform a style transfer of the predefined textual feature attributes;
- modify the digital text data using the textual feature; and
- a user interface subsystem configured to generate the feedback based on the modified digital text data and to reproduce the generated feedback to the user (U).

12. The system according to claim 11, further comprising a textual feature attribute database comprising predefined textual feature attributes each having a predefined attribute weighting required to generate the textual feature, or, a link to the textual feature attribute database comprising the predefined textual feature attributes each having the predefined attribute weighting.

13. The system according to claim 11, wherein the system is configured to run a computer-implemented method for generating the feedback based on the handwritten text.

14. The system according to claim 11, wherein the capturing subsystem is configured to generate the tracking data of the writing instrument during a writing operation.

15. The system according to claim 14, wherein the tracking data comprises one or more of motion tracking data of the writing instrument, visual data of a writing medium and/or the writing instrument, and capacity sensitive surface data of a capacity sensitive surface.

16. The system according to claim 11, wherein the processing subsystem is configured to run a textual feature selection algorithm configured to select relevant predefined textual features, each having associated predefined textual feature attributes and predefined attribute weightings.

17. The system according to claim 16, wherein the textual feature selection algorithm is configured to determine the relevant predefined textual features by comparing and/or associating the predefined textual feature attributes with the at least one handwritten text attribute, more specifically wherein the predefined attribute weightings are altered based on the compared and associated predefined textual feature attributes and the at least one handwritten text attribute.

18. A non-transitory computer-readable storage medium carrying one or more sequences of one or more instructions for generating feedback based on a handwritten text which, when executed by one or more processors, cause an apparatus to at least perform the following steps:
- initializing a writing instrument to be used in a writing operation comprising the handwritten text;
- capturing and processing the handwritten text to generate digital text data by applying a writing digitization algorithm, wherein applying the writing digitization algorithm includes converting tracking data to a set of handwriting feature vectors, and converting the set of handwriting feature vectors to the digital text data via vector-to-character mapping;
- identifying at least one handwritten text attribute associated with the digital text data;
- comparing the at least one handwritten text attribute with predefined textual feature attributes;
- generating a textual feature based on the compared at least one handwritten text attribute and the predefined textual feature attributes, wherein generating the textual feature comprises applying a textual feature generator network trained to perform a style transfer of the predefined textual feature attributes;
- modifying the digital text data using the textual feature; and
- generating the feedback to a user (U) based on the modified digital text data.

19. The method according to claim 18, wherein modifying the digital text data using the textual feature comprises applying the textual feature generator network configured to transform the digital text data to a vector image based on altered predetermined textual feature attribute weightings.

* * * * *